United States Patent [19]

Dudley

[11] Patent Number: 4,866,874
[45] Date of Patent: Sep. 19, 1989

[54] LURE CASTING FLOAT

[76] Inventor: Jerome M. Dudley, 210 N. Pleasant Ave., Galesburg, Ill. 61401

[21] Appl. No.: 111,927

[22] Filed: Oct. 23, 1987

[51] Int. Cl.$^4$ .............................................. A01K 97/04
[52] U.S. Cl. .................................... 43/41.2; 43/43.11; 43/43.12
[58] Field of Search ................... 43/43.12, 43.11, 41.2

[56] References Cited

U.S. PATENT DOCUMENTS

| | | | |
|---|---|---|---|
| 2,460,526 | 2/1949 | Oliver | 43/43.12 |
| 3,214,858 | 11/1965 | Louie | 43/41.2 |
| 4,406,081 | 9/1983 | Garner | 43/43.11 |
| 4,534,127 | 8/1985 | Thorvaldsen | 43/41.2 |
| 4,571,878 | 2/1986 | Nyman | 43/43.11 |
| 4,574,515 | 3/1986 | Garner | 43/43.11 |

Primary Examiner—Gene P. Crosby

[57] ABSTRACT

A rectangular box shaped casting device comprising a bouyant housing containing within a U shaped retaining area in one end of the housing a folded piece of soft absorbent plastic foam material capable of storing a fish attractant scent substance and imparting that scent substance to a lure held captive in the fold of the foam material prior to the release of the lure in flight. The housing is attached to a fishing line with a part of that line embedded within a slit located in the solid end of the housing and the line secured therein by retainer pins inserted in the housing above the embedded line. A predetermined length of line is wound around the housing midway between the ends of the housing. The lure and the predetermined length of line to which the lure is attached are released in flight from the casting device by applying the brake on the spincast reel.

3 Claims, 1 Drawing Sheet

4,866,874

LURE CASTING FLOAT

DESCRIPTION

1. Technical Field

The invention relates to fishing equipment and more particularly to a special purpose combination casting float that can transport a lure in flight and allow said lure to depart from said casting float in flight on command or signal, the lure to continue onward in flight by inertia and the lure making contact with the surface of the water.

2. Background Art

Line and bait release casting floats and bobbers in the prior art show in part a dependency on mechanical means to accomplish their objective.

It is the object of the invention to devise a casting float that is non-mechanical in construction and performance said casting float being capable of transporting and releasing a lure in flight when the casting float with the lure is cast in a forward motion from a combination spin cast rod and reel.

Another object of the invention is to devise a means for storing a fish attractant scent substance in the casting float, the scent substance to be imparted to the captive lure in flight prior to the release of said lure in flight.

DISCLOSURE OF THE INVENTION

The objects have been met by a lure casting float comprized of a bouyant housing with one solid end thereof in which a line receiving slit is located. The other end of the housing has a U shaped retaining area, the retaining area having means to store a fish attractant scent substance and impart said scent substance to a lure held captive by said means. Fishing line is placed in the slit located in the solid end of the housing and pins of suitable size are inserted in the housing above the seated line for the purpose of securing the line to the housing. A predetermined length of fishing line between the casting float and the lure is would around the housing midway between the two ends of said housing and the lure is placed in the grasp of the scent substance depository means contained in the U shaped retaining area of the housing. The scent substance depository means consists of a flexable absorbent soft sponge material shaped externally to fit the U shaped area of the housing and the perimeters thereof. The retention of the lure in the grasp of the scent substance depository insert is attained through the use of the flexible opposing lips. The lure is released from the casting float in flight at the desired moment by applying the brake on the spincast reel. The combination weight and forward momentum of the lure being greater than the restraint of the scent substance depository insert coupled with the sudden lack of forward movement of the casting float causes the release of the lure from said casting float in flight, the lure taking with said lure the predetermined length of fishing line that was wound midway around the housing.

BEST MODE FOR CARRYING OUT THE INVENTION

Figure 1:
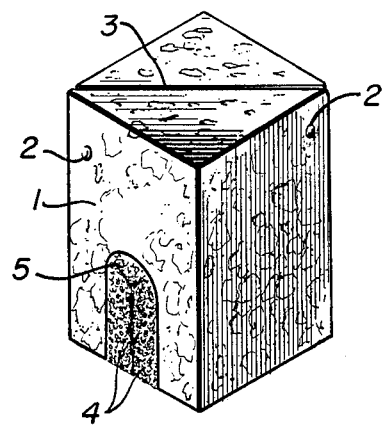
FIG. 1 is a perspective view showing the side, front and top of the present invention.

With reference to FIG. 1, one embodiment of the lure casting float is shown. The main body of the lure casting float has a bouyant housing 1. The line receiving slit 3 is provided in the solid end of said housing.

Figure 2:
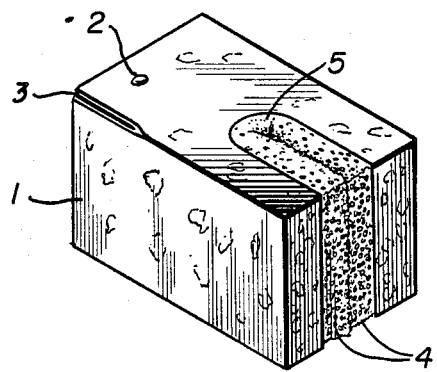
FIG. 2 is a perspective view showing the side, front and bottom of the present invention.

With reference to FIG. 2, the insert combination scent substance depository 5 with opposing lips 4 is made from an absorbent flexible plastic foam material of suitable thickness cut to fit the matching size area in the U shaped retaining end of the housing 1. The foam insert strip 5 is folded upon itself to form two lips 4 of equal length in close proximity to each other. The foam insert strip 5 is joined to the matching area surface of the U shaped retaining area of the housing 1.

Figure 3:
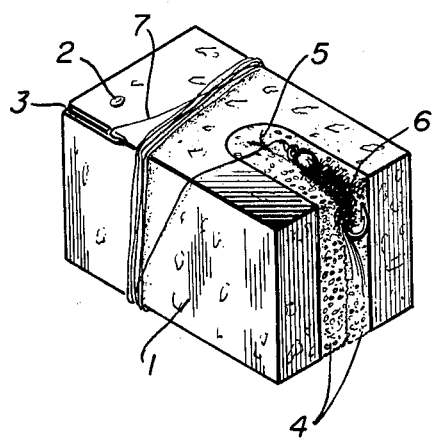
FIG. 3 is a perspective view showing the side, front and bottom of the present invention with fishing line attached thereto and lure in position.

With reference to FIG. 3, fishing line 7 is seated in the slit 3 in the solid end of the housing 1 with the pins 2 inserted into the solid end of the housing 1 just above the seated fishing line 7 in slit 3, the purpose of said pins 2 being to secure housing 1 to the fishing line 7. A predetermined length of fishing line 7 between one end of slit 3 and the lure 6 is wound around the body of the housing 1 midway between the two ends of said housing 1 and the lure 6 is placed between the lips 4 of the scent substance depository insert 5. Retention of the lure 6 in the grasp of the lips 4 is assured because of the resiliency of the material in the scent substance depository insert 5 allows the inner surface of the opposing lips 4 to conform to the contour of the body of the lure 6.

While various changes may be made in the detailed construction it shall be understood that such changes shall be within the spirit and scope of the present invention as defined by the appended claims.

What I claim as new and desire to protect by Letters Patent of the United States is:

1. A fishing line casting float comprizing a housing, said housing having means for storing and imparting a fish attractant substance to a lure while transporting a lure in flight and means allowing for the release of said lure in flight from the housing prior to the housing and the lure making contact with the surface of the water.

2. The combination according to claim 1 where a bouyant housing has a line receiving slit in one solid end thereof with line retaining pins and the other end of the bouyant housing containing in a U shaped retaining area a soft sponge plastic depository with opposing lips capable of storing and imparting a fish attractant substance.

3. The combination according to claim 2 wherein the opposing lips have the capability to secure a lure in their grasp with such restraint as is necessary while the lure is conveyed in flight and means for allowing for the release of said lure in flight from the grasp of those opposing lips when forward momentum of the float housing is stopped due to the brake being applied on a spinning reel for casting the float.

* * * * *